(No Model.)
G. F. CARSLEY.
TRANSPLANTER.
No. 344,814. Patented July 6, 1886.
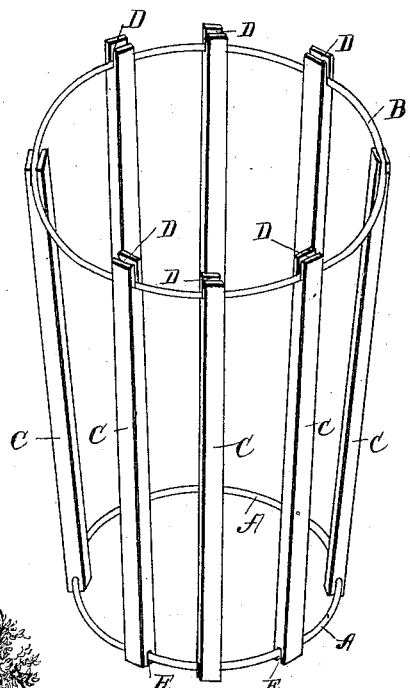
Fig. 1.
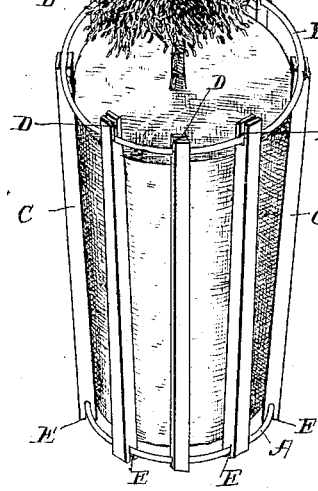
Fig. 2.
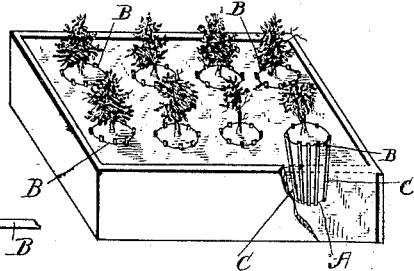
Fig. 3.
Fig. 4.
Witnesses
James M. Hilton
J. W. Garner
Inventor
Geo. F. Carsley
By his Attorneys
C. A. Snow & Co.

UNITED STATES PATENT OFFICE.

GEORGE FRANKLIN CARSLEY, OF MAYSVILLE CENTRE, MAINE.

TRANSPLANTER.

SPECIFICATION forming part of Letters Patent No. 344,814, dated July 6, 1886.

Application filed April 1, 1886. Serial No. 197,435. (No model.)

*To all whom it may concern:*

Be it known that I, GEORGE FRANKLIN CARSLEY, a citizen of the United States, residing at Maysville Centre, in the county of Aroostook and State of Maine, have invented a new and useful Improvement in Transplanters, of which the following is a specification, reference being had to the accompanying drawings.

My invention relates to an improvement in transplanters; and it consists in the peculiar construction and combination of devices, that will be more fully set forth hereinafter, and particularly pointed out in the claims.

In the drawings, Figure 1 is a perspective view of a transplanter embodying my improvements. Fig. 2 is a similar view of the same filled with earth and having a plant therein. Fig. 3 is a perspective view of a box for starting plants, showing a number of my transplanters buried therein. Fig. 4 is a detail sectional view.

A represents a circular hook or ring, which is preferably made of wire, and forms the bottom of the transplanter. B represents a similar hook or ring, which is somewhat larger than the ring A. The rings A and B are connected together by a series of bars, C, which are provided at their upper ends with slots D, adapted to receive the ring B, and at their lower ends with slots E, adapted to receive the ring A. The transplanter is thus composed of the rings A and B and the connecting slotted bars C. It will be readily understood from this description that the transplanter may be readily taken to pieces by first removing the upper ring, B, from the upper end of the bars C and then pulling the latter from the lower ring, A. The said bars C may be made of wood or metal or any other preferred material.

The operation of my invention is as follows: A number of my transplanters are placed in a box or starting-bed and the said box is filled with earth, thus also filling the transplanters, as shown in Fig. 3. The seeds are planted in the earth inclosed by the transplanters, and when the seeds sprout and the plants attain the proper size for transplanting, the transplanters are carefully withdrawn from the box. As the lower ring is smaller than the upper ring, it follows that the bars C, connecting the said rings, are inclined, the transplanter being thus shaped like the frustum of an inverted cone, and is thus enabled to retain the earth inclosed between its bars when the transplanter is withdrawn from the box. It will thus be readily understood that the plants may be removed from the box or bed without injuring their roots or uncovering the same, and readily transplanted by placing the transplanters in a suitable opening in the garden. The plants may be thus "set out" without injury to their roots and without retarding their growth. After the plants are transplanted, the top ring, B, which is slightly above the level of the bed, is removed from the bars C, and the latter are gently withdrawn from the lower ring, A, the latter being left in the bed directly below the plants, which serves to locate it and enable it to be recovered after the plants die in the autumn.

A transplanter thus constructed is extremely cheap and simple, may be packed into a very small space for transportation, and enables plants to be transplanted without injuring their roots or retarding their growth.

It will be observed that the sides of the transplanter are provided with openings, through which the roots of the plant may extend into the ground after the transplanter, with the plant, has been set out. When the plant is permitted to grow in the transplanter until its roots pass through the openings in the sides thereof, the transplanter is permitted to remain in the ground until the plant dies in the autumn, when the transplanter may be readily recovered.

I have discovered that by using a large transplanter in climates where the seasons are short, if the fruits are not ripe in the fall when the frost comes, the earth can be taken from around the transplanter, and the plant, with its green fruit, can be taken up and placed in a box and carried into the house and placed in a window, where the fruit will ripen, and thus prevent it from being destroyed by the frost.

Having thus described my invention, I claim—

1. The transplanter comprising the lower ring or hoop, A, the upper ring or hoop, B, of greater diameter, and the bars C, connecting the said rings or hoops, substantially as described.

2. The combination, in a transplanter, of the lower and upper rings or hoops and the bars connecting the said rings or hoops and detachably secured thereto, substantially as described.

3. In a transplanter, the combination of the upper and lower rings or hoops and the bars C, having the slots adapted to receive the said rings or hoops, for the purpose set forth, substantially as described.

In testimony that I claim the foregoing as my own I have hereto affixed my signature in presence of two witnesses.

GEORGE FRANKLIN CARSLEY.

Witnesses:
M. W. BROWN,
J. B. HALL.